(12) United States Patent
Homayoun et al.

(10) Patent No.: US 11,822,651 B2
(45) Date of Patent: Nov. 21, 2023

(54) ADVERSARIAL RESILIENT MALWARE DETECTOR RANDOMIZATION METHOD AND DEVICES

(71) Applicant: The Regents of the University of California, Oakland, CA (US)

(72) Inventors: Houman Homayoun, San Jose, CA (US); Prasant Mohapatra, Davis, CA (US); Han Wang, Davis, CA (US); Setareh Rafatirad, San Jose, CA (US)

(73) Assignee: The Regents of the University of California, Oakland, CA (US)

( * ) Notice: Subject to any disclaimer, the term of this patent is extended or adjusted under 35 U.S.C. 154(b) by 309 days.

(21) Appl. No.: 17/482,077

(22) Filed: Sep. 22, 2021

(65) Prior Publication Data

US 2023/0089338 A1 Mar. 23, 2023

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC . G06F 21/554; G06F 2221/034; G06F 21/566
See application file for complete search history.

(56) References Cited

U.S. PATENT DOCUMENTS

| | | | |
|---|---|---|---|
| 11,025,666 B1 | 6/2021 | Han et al. | |
| 2018/0189667 A1* | 7/2018 | Tsou | G06N 5/01 |
| 2019/0102337 A1* | 4/2019 | Brabec | G06N 5/04 |
| 2019/0156183 A1 | 5/2019 | Durham et al. | |
| 2020/0233956 A1 | 7/2020 | Wang et al. | |
| 2020/0387602 A1* | 12/2020 | Kursun | G06F 21/554 |
| 2021/0157912 A1* | 5/2021 | Kruthiveti Subrahmanyeswara Sai | G06N 20/00 |
| 2021/0303675 A1* | 9/2021 | Petersen | G06N 20/00 |
| 2022/0368700 A1* | 11/2022 | Bagaria | H04L 63/1425 |
| 2023/0185912 A1* | 6/2023 | Sinn | G06F 21/56 726/23 |
| 2023/0229738 A1* | 7/2023 | Cleere | G06N 5/01 706/12 |

FOREIGN PATENT DOCUMENTS

EP 3709228 A1 * 9/2020 ............. G06N 20/00

* cited by examiner

*Primary Examiner* — Christopher A Revak

(57) ABSTRACT

The embodiments disclose a system and method including a random number generator coupled to the randomized machine learning-based malware detector configured for determining changes of settings and selections of parameters, candidate classifiers integrated with the randomized machine learning-based malware detector and configured to be initiated by a random number to avoid transferable learning, a set of feature combinations for random feature selection including monitoring granularity and detection prediction latency and a random number for identifying a set of feature combinations that minimize the overhead and maintain enough variance in data for baffling the malware adversarial attacks.

20 Claims, 12 Drawing Sheets

ADVERSARIAL RESILIENT MALWARE DETECTOR RANDOMIZATION METHOD AND DEVICES

BACKGROUND

Malware is a catch-all term for any type of malicious software designed to harm, or exploit any programmable device, service, or network. Malware attacks on governmental and private sector programmable devices have grown every year and are projected to cost the world $10.5 trillion annually by 2025. Businesses fall victim to malware attacks every 11 seconds. Over 3 billion computers and 14 billion mobile devices worldwide are subject to malware attacks from domestic and international attacks that are growing in sophistication and frequency.

Malware detectors have become one of the most important defense mechanisms to protect computer systems from attacks. Such detectors profile benign applications and attacks with run-time data information for example system-call, hardware performance counters, etc. Though great progress has been made, these static malware detectors are vulnerable to adversarial attacks which adopt adversarial learning and craft new attacks to bypass the static ML-based detectors.

DETAILED DESCRIPTION OF THE INVENTION

In the following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

General Overview

It should be noted that the descriptions that follow, for example, in terms of an adversarial resilient malware detector randomization method and devices are described for illustrative purposes and the underlying system can apply to any number and multiple types of operating systems. In one embodiment of the present invention, the adversarial resilient malware detector randomization method and devices can be configured using a random number generator. The adversarial resilient malware detector randomization method and devices can be configured to include a classifier selection and can be configured to include machine learning using the present invention.

Machine learning classifiers (ML classifiers) are used for classification. Classification is a process of predicting the class of given data points. For example, spam detection in email service providers can be identified as a classification problem. This example is a binary classification since there are only 2 classes as spam and not spam. A classifier utilizes some training data to understand how given input variables relate to the class. In this case, known spam and non-spam emails have to be used as the training data. When the classifier is trained accurately, it can be used to detect an unknown email.

The terms "program and app classifier" and "classifier" are used interchangeably herein in singular and plural forms without any change in meaning.

The terms "randomized machine learning-based malware detector", "machine learning (ML) based detectors", "randomized ML-based malware detector" are used interchangeably herein in singular and plural forms without any change in meaning.

Figure 1:
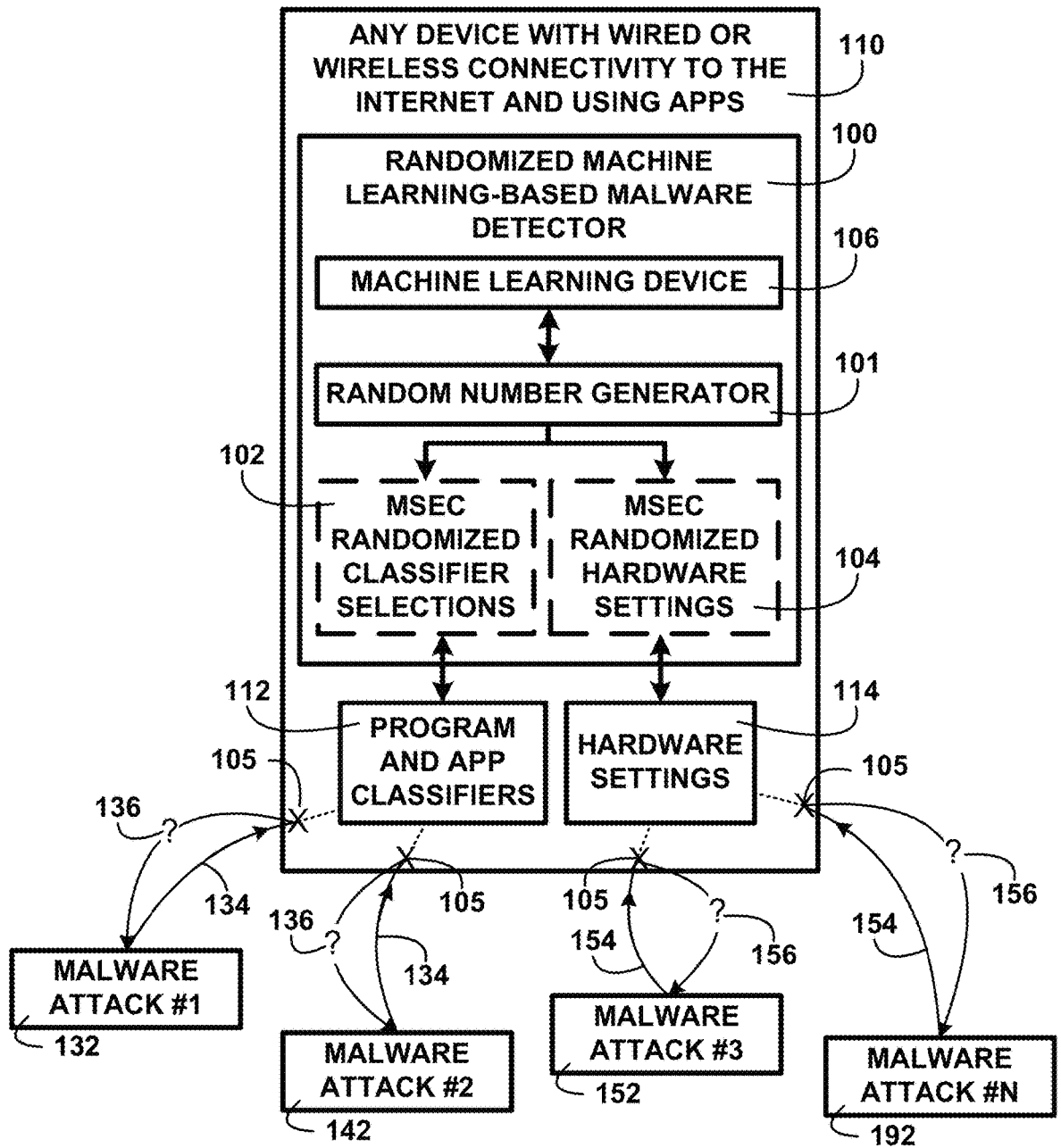
FIG. 1 shows for illustrative purposes only an example of a randomized machine learning-based malware detector of one embodiment.

FIG. 1 shows for illustrative purposes only an example of a randomized machine learning-based malware detector of one embodiment. FIG. 1 shows any device with wired or wireless connectivity to the internet and using apps 110 with a randomized machine learning-based malware detector 100 installed. The randomized machine learning-based malware detector 100 includes a machine learning device 106 and a random number generator 101 to initiate a different setting of the internet-connected device programming and hardware. These machine learning (ML) based detectors are trained to predict whether a running program contains malicious activities or not.

This is accomplished with msec randomized classifier selections 102 and msec randomized hardware settings 104. This generates constantly changing program and app classifiers 112 and hardware settings 114. When for example malware attack #1 132 starts an attack on program and app classifiers 134 and it takes time to identify and learn which classifier is operating in order to breach the operations and access user data or place a ransomware virus. In this example the malware attack #1 132 is thwarted by the randomized machine learning-based malware detector 105 as the malware device programming cannot determine the features of the constantly changing program and app classifiers 136 in between the msec randomized classifier selections 102 changes. Malware attack #2 142 can be from the same adversarial attacker or a different attacker at the same time or after the first attack.

Malware attack #2 142 starts an attack on program and app classifiers 134. For example, Malware attack #2 142 is made by the same attacker cannot learn from the first attack as the randomized changes are constantly occurring and because they are randomly made with multiple features there is no way the adversarial attacker can learn from the first encounter since each set of changes in features is different and cannot be predetermined. So the Malware attack #2 142 is also thwarted by the randomized machine learning-based malware detector 105 since the malware device programming cannot determine the features of the constantly changing program and app classifiers 136 before the next randomized changes.

Malware attack #3 152 is a change in strategy to attack hardware settings 154 to breach the device operations. Again malware attack #3 152 is thwarted by the randomized machine learning-based malware detector 105. In this instance, the malware device programming cannot determine the features of the constantly changing hardware settings 156 before changes are made randomly. The last example is malware attack #N 192 is a change in strategy to attack hardware settings 154 to breach the device operations. Again malware attack #N 192 is thwarted by the randomized machine learning-based malware detector 105. In this instance, the malware device programming cannot determine the features of the constantly changing hardware settings 156 before changes are made randomly.

The number of adversarial attackers and the number of simultaneous malware attacks do not affect the stonewalling effect of the randomized device feature changing every msec. Whether the malware attack starts an attack on program and app classifiers 134 or an attack on hardware settings 154 it will be thwarted by the randomized machine learning-based malware detector 105, because the malware device programming cannot determine the features of the constantly changing program and app classifiers 112 or hardware settings 114. Randomizing the changes in device operating features at msec intervals prevents the adversarial attackers from machine learning features being utilized and presents vulnerability rapidly enough to plant a virus or access user data of one embodiment.

Adversarial white-box attacks assume the adversary knows everything related to trained neural network models, including training data, model architectures, hyper-parameters, numbers of layers, activation functions, model weights. Many adversarial examples are generated by calculating model gradients. Since deep neural networks tend to require only raw input data without handcrafted features and to deploy end-to-end structure, feature selection is not necessary compared to adversarial attack examples in machine learning.

Adversarial black-box attacks assume the adversary has no access to the trained neural network model. The adversary, acting as a standard user, only knows the output of the model (label or confidence score). This assumption is common for attacking online machine learning services. Most adversarial attacks are white-box attacks. However, they can be transferred to attack black-box services due to the transferability of adversarial attack examples.

Many current cybersecurity systems attempt to detect and combat these adversarial attacks with static signature-based detection. However, the static unchanging nature of these current systems makes them vulnerable to adversarial attacks and allows cybercriminals to reach sensitive data on a computer. While malware attack software is evolving, the current anti-malware systems are remaining static and are not keeping up with the advancing cybercriminals.

To solve these current malware problems, the present invention is using a cost-effective constantly changing, and dynamic system that is unpredictable by malware systems. The robust randomized machine learning-based malware detector 100 to thwart malware attacks is an improvement of the current static systems. This invention provides a randomly generated number to identify the randomized machine learning-based malware detector components being used and the component hardware settings. This method creates a moving target that makes it difficult, if not impossible, for the malware attack software to break through cybersecurity due to this constantly changing algorithm.

The randomized, unpredictable and frequently changing algorithm of the present invention creates a massive obstacle for the malware attack software to overcome. The present invention builds adversarial resilient detectors by changing settings across from architecture level, system level, feature collection granularity, and the choice of program and app classifiers 112.

This method masks the information of an in-use randomized machine learning-based detector 100 from adversarial attackers and maximizes the randomization of selected settings, resulting in the difference between the actual randomized ML-based malware detection model and the attackers' inferred ML model. The randomized machine learning-based malware detector 100 provides a viable cybersecurity protection system against malware attacks for the tens of billions of computers and mobile devices and significantly reduces the trillions of dollars of losses caused by the malware attacks.

DETAILED DESCRIPTION

Figure 2:
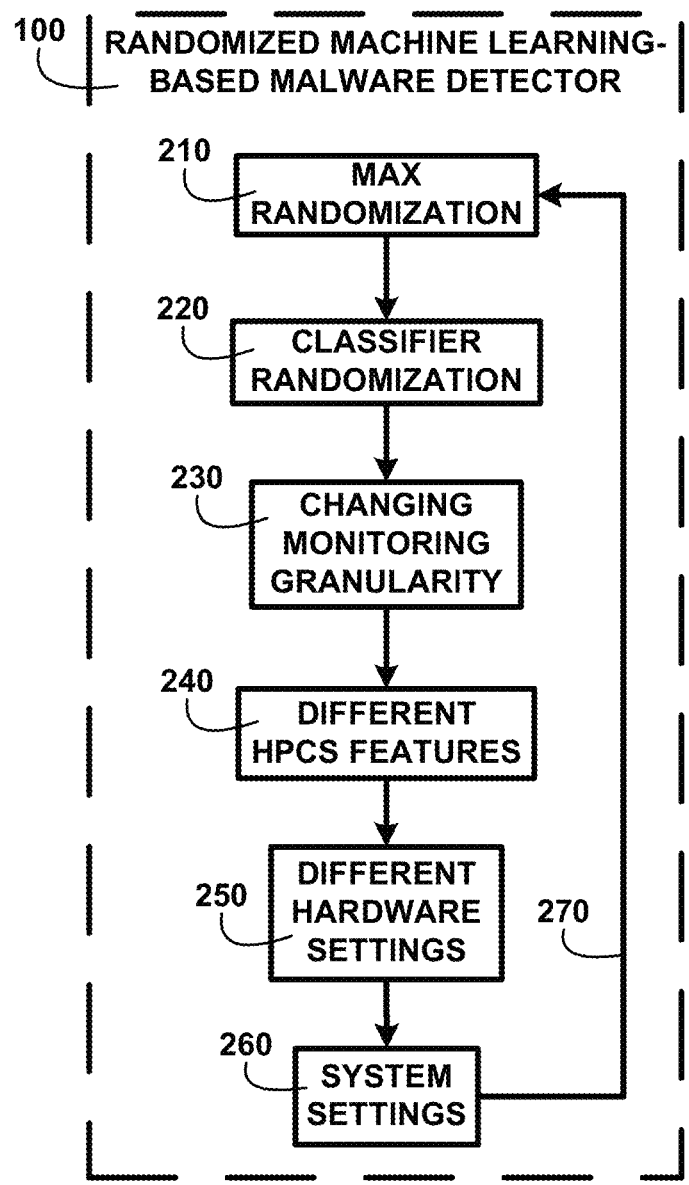
FIG. 2 shows a block diagram of an overview of the system setting of one embodiment.

FIG. 2 shows a block diagram of an overview of the system setting of one embodiment. FIG. 2 shows system settings that are manipulated by the randomized machine learning-based malware detector 100 using the random number generated. The changes of the system settings include max randomization 210, classifier randomization 220, changing monitoring granularity 230, different HPCs features 240, and different hardware settings 250. Periodic randomization 270 of the system settings 260 changes the target being attacked preventing the malware from using adversarial learning to breach the security.

The max randomization 210 process changes the ML parameters at randomized intervals initiated by the random number generator. The random number generator 101 of FIG. 1 resets parameters at intervals ranging from 1.1 milliseconds to 1.0 second. Resetting one or more parameters of a first machine-learning process, wherein a frequency of resetting the one or more parameters of the first machine-learning process is faster than a shortest time period that a second machine-learning process is capable of determining two or more parameters of the first machine-learning process. The frequency of resetting parameters changes is faster than the malware adversarial learning process and prevents the malware adversarial attack from breaching the security of the user systems.

Classifier randomization 220 process changes the classifiers being used in the randomized machine learning-based malware detector 100 at the same frequency generated by the random number generator 101 of FIG. 1. Changing classifiers frequently disrupts the malware adversarial learning process.

Changing monitoring granularity 230 includes determining a trade-off among monitoring granularity, prediction latency, and accuracy for the set of granularity candidates. Data granularity is a measure of the level of detail in a data structure. Prediction latency is the delay before a transfer of data begins following an instruction for its transfer. The level of data granularity determines what analysis can be performed on the data. The more granularity, the more information is available for analysis, but at a cost of increased storage, memory, and required computing resources. Some analysis may require data to be analyzed at a higher level and accuracy for the set of granularity candidates will be considered based on the data granularity and capability of the granularity candidates to perform the analysis and time taken to perform the analysis.

Hardware Performance Counters (HPCs) are a set of special-purpose registers built into modern microprocessors to store the counts of hardware-related activities within computer systems. Different HPCs features 240 include providing low-overhead access, kind of computer architecture, and CPU's functional units, caches, and main memory from which counts of hardware-related activities are being processed.

Different hardware settings 250 can impact the overall performance and system function. For example, hardware settings include but are not limited to adjustments of accessible memory, connected devices, disc drivers, modems/serial ports, and some power management features. Adjusting the hardware settings with the randomization frequency disrupts the malware adversarial learning process.

System settings 260 include but are not limited to network settings including network and internet, including wireless and wired local networks, display settings, time and language settings, applications (apps), and software updates and information security. Adjusting the system settings with the randomization frequency disrupts the malware adversarial learning process.

The randomized machine learning-based malware detector 100 random number generated frequency of changes of the computer features and settings is constantly changing the target the malware adversarial learning is trying to break through to prevent a breach of the security and thwart the attack of one embodiment.

Final ML Detector

Figure 3:
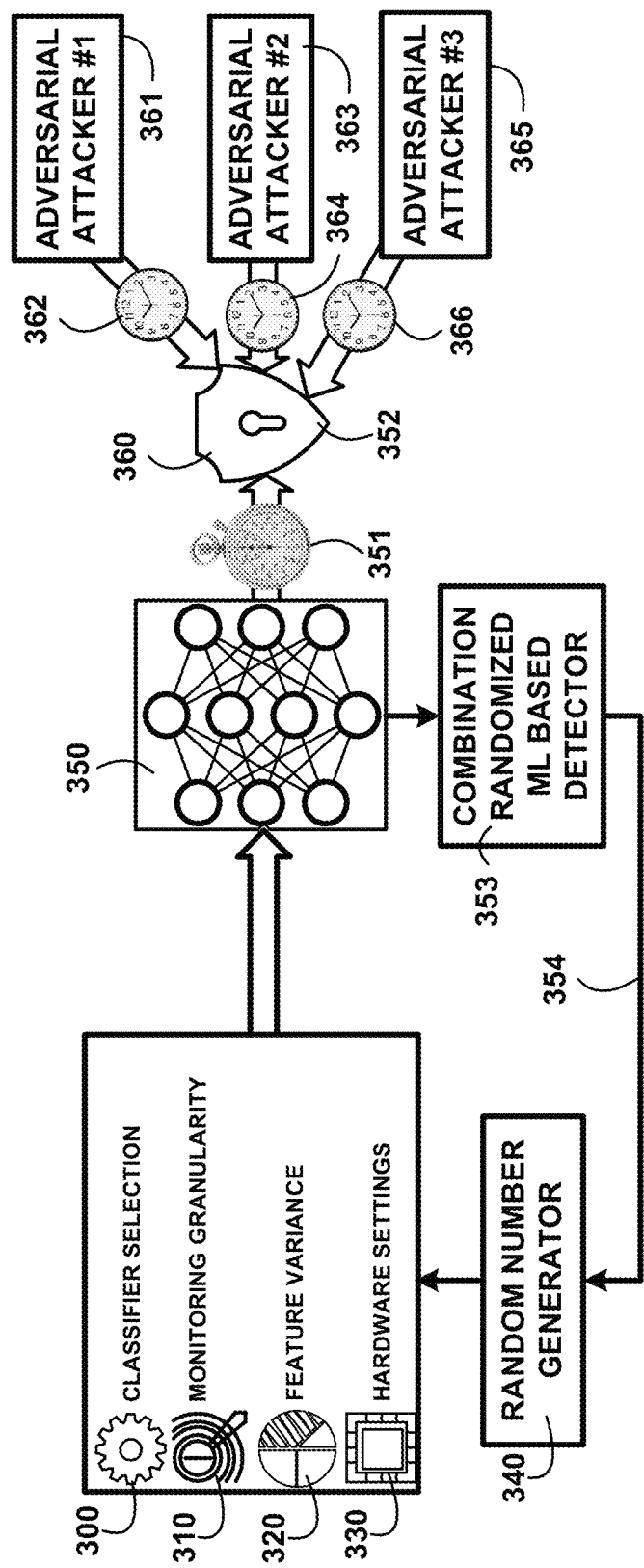
FIG. 3 shows for illustrative purposes only an example of the final ML detector malware attack deterrent of one embodiment.

FIG. 3 shows for illustrative purposes only an example of the final ML detector malware attack deterrent of one embodiment. FIG. 3 shows the randomized machine learning-based malware detector 100 of FIG. 1 using the random number generated for classifier selection 300, monitoring granularity 310, feature variance 320, and hardware setting 330 changes. The random number generator 340 allows changes to be analyzed and determined to create an interval randomized ML-based detector changed settings 350 as a combination randomized ML-based detector 353 for adversarial attack detector protection 360 with randomization frequency in milliseconds 351.

FIG. 3 shows adversarial attacker #1 361 taking time for attack #1 362, adversarial attacker #2 363 taking time for attack #2 364, and adversarial attacker #3 365 taking time for attack #3 366. Frequent interval randomized changes in parameter settings 354 prevent malware attacks because the adversarial attacker cannot determine interval randomized ML-based detector changed settings 350 to access the device system. The number of adversarial attackers and the number of simultaneous malware attacks do not affect the stonewalling effect of the randomized device feature changing every msec.

The combination randomized ML-based detector 353 combines the randomized changes in parameter settings of the classifier selection 300, monitoring granularity 310, feature variance 320, and hardware setting 330 changes to change the target the malware attack is trying to learn. The malware attack takes time to identify and learn for example which classifier is operating in order to breach the operations and access user data or place a ransomware virus. The combination randomized ML-based detector 353 changes the attacker's target with a frequency that does not allow the time the malware attack needs to learn the target and breach the security of one embodiment.

Training Machine Learning Classification

Figure 4:
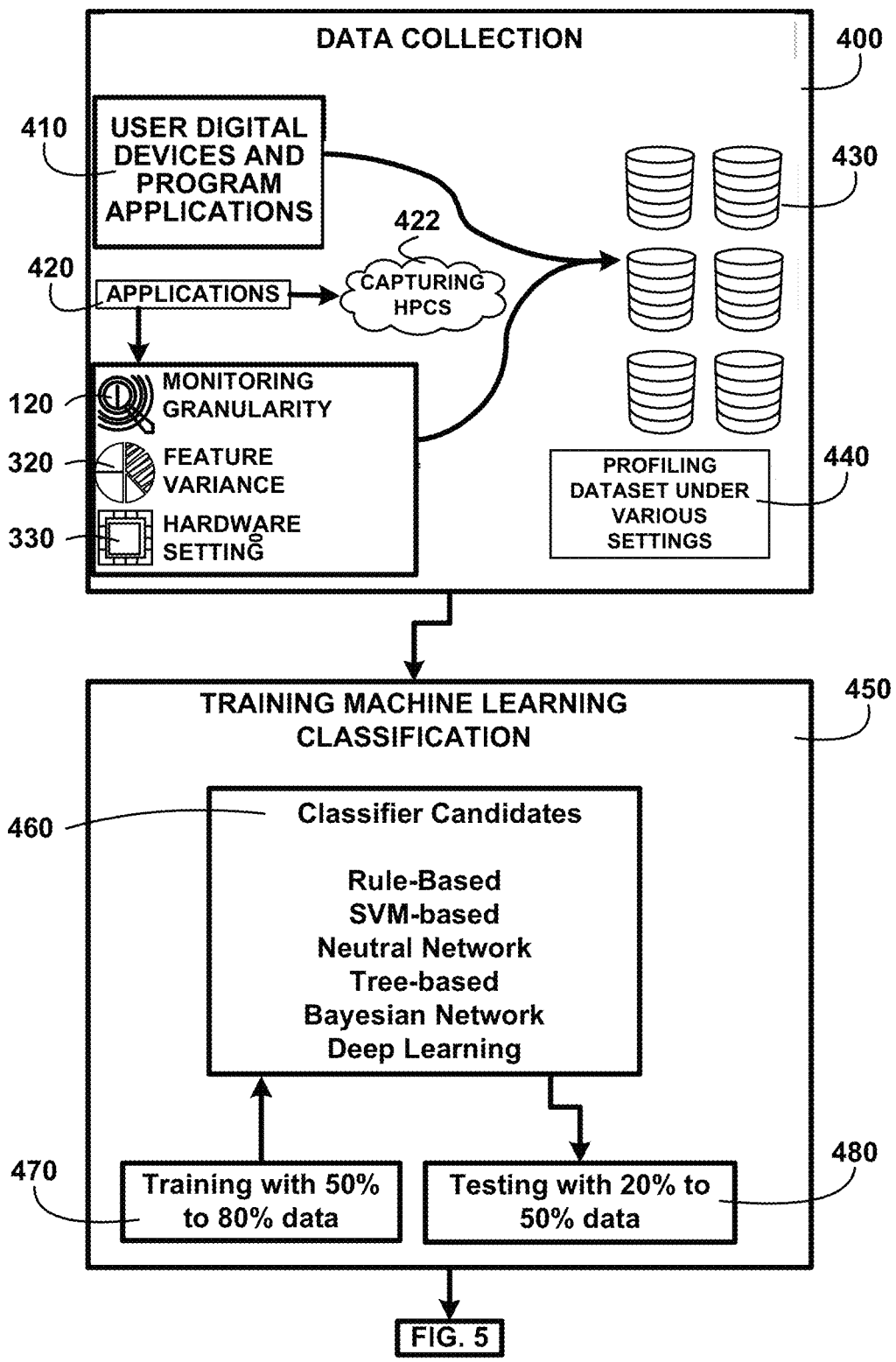
FIG. 4 shows for illustrative purposes only an example of training machine learning classification of one embodiment.

FIG. 4 shows for illustrative purposes only an example of training machine learning classification of one embodiment. FIG. 4 shows data collection 400 can include a set of benign applications including MiBench benchmark suite, Linux system programs, browsers, text editors, and word processors. For malware applications, malware is collected from malware samples. Malware applications include scripts, which are created to perform malicious activities. Collecting the HPCs malware samples is performed under various settings, for example monitoring granularity, different HPCs features, and hardware settings. Data on user digital devices and program applications 410 is also collected.

Applications 420 capturing HPCS 422 provides additional hardware-related events. A Perf tool is a group of hardware performance counters that are a set of special-purpose registers built-in modern microprocessors to capture the count of hardware-related events. The count of hardware-related events has been extensively used to predict the power, performance tuning, debugging, and energy efficiency of computing systems. It also helps to enhance systems' security by providing micro-architectural information of malware, side-channel attacks, and building detectors based on the events' information. Linux-based operating systems are equipped with Perf which can obtain information on various hardware and software events related to a program. Executing the command "Perf stat" and setting proper parameters for example sampling interval, then monitoring the HPCs data with the executable file and storing the HPCs data as an in-text file.

The randomized machine learning-based malware detector 100 of FIG. 1 uses randomized changes in monitoring granularity 120, feature variance 320, and hardware settings 330 for data storage devices 430 for profiling dataset combinations under various settings 440. Training machine learning classification 450 utilizing program and app classifiers 112 from different categories are explored to build effective and cost efficiency randomized machine learning-based malware detectors 100 of FIG. 1. The rationale for choosing these machine learning models is that they are from different branches of machine learning, covering a diverse range of learning algorithms that support a comprehensive analysis.

These different branches of machine learning provide a diverse range of classification algorithms as candidates to select from. All data collected is split into two parts: training and testing. Such program and app classifiers are trained with 50% to 80% of each dataset combination from the prior step. After the training with 50% to 80% data 470, all classifier candidates 460 will also be tested with the remaining data. Testing with 20% to 50% data 480 is to evaluate the accuracy of each trained classifier. The descriptions continue in FIG. 5.

Online Deployment

Figure 5:
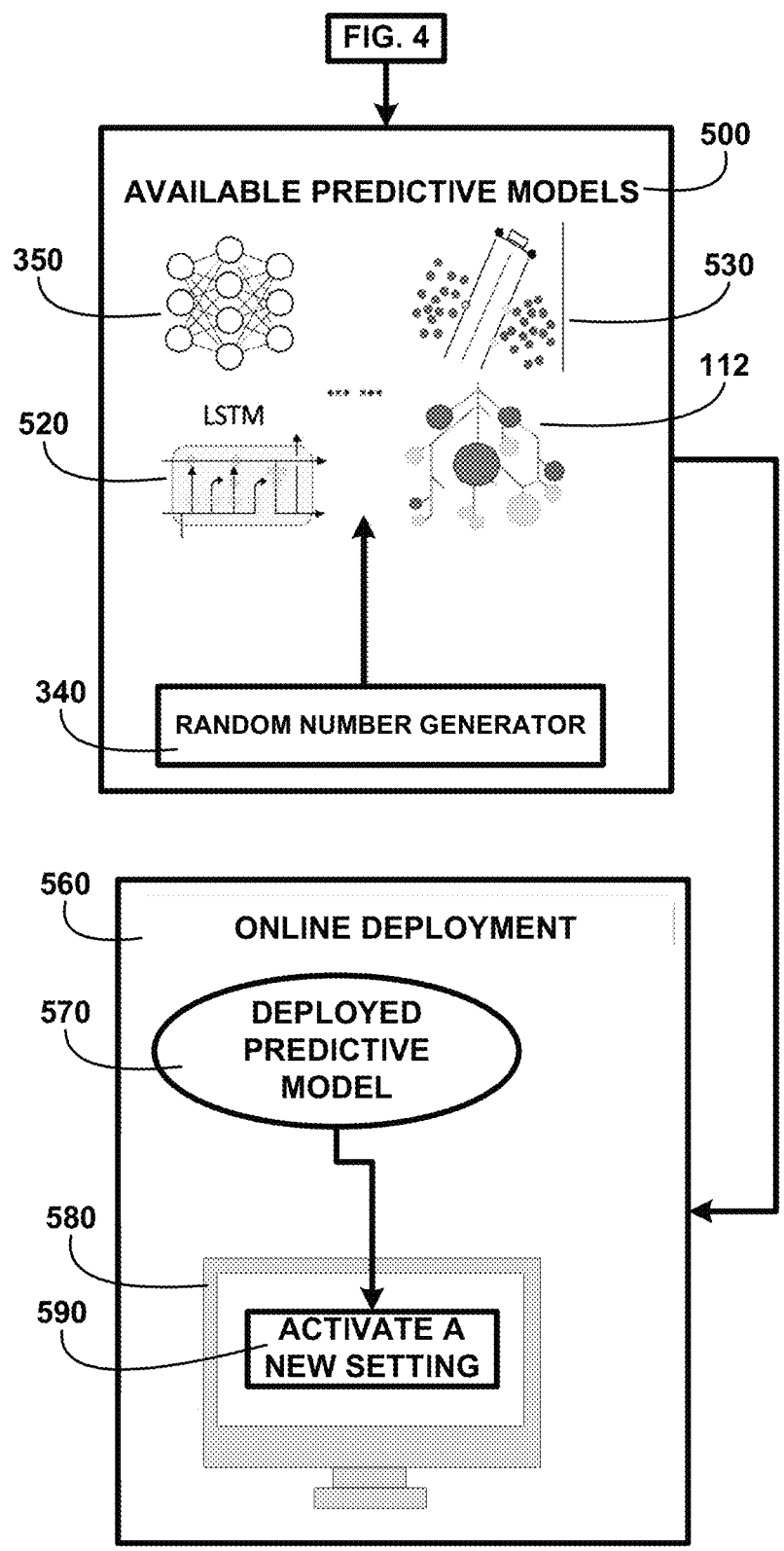
FIG. 5 shows for illustrative purposes only an example of online deployment of one embodiment.

FIG. 5 shows for illustrative purposes only an example of online deployment of one embodiment. FIG. 5 shows a continuation from FIG. 4 showing available predictive models 500 including interval randomized ML-based detector changed settings 350, long short-term memory (LSTM) 520, granularity 530, and program and app classifiers 112 that are available for determination with the random number generator 340 leveraged random numbers in each instance. Online deployment 560 of the random-based parameter settings provide a deployed predictive model 570 on in this example the user computer 580 will activate a new setting 590 on one embodiment. Once the program and app classifiers 112 are trained, a set of predictive models are available to be chosen according to the value of the random number generated. The settings which are monitoring granularity sampled HPC features and hardware settings will be activated accordingly based on the random number. In this way, the online sampling data will be consistent with the data record needed by the deployed predictive model. The settings of the four parameters changes based on the generated random number and the corresponding running ML-model will be adapted. In this way, the detector still has the information of the setting and captures applications' run-time data under the new setting while the adversarial attacker is still built based on prior knowledge and not able to achieve evasion from the detector.

The online deployment utilizes the randomized ML-based malware detector with robustness and resilience towards adversarial attacks. The randomized ML-based malware detector implements the random generator that determines the set of parameters. Randomization of the settings of parameters and for example the selection of candidate classifiers that are from different types of machine learning classification algorithms to avoid transferable learning. The randomization method determines a trade-off among monitoring granularity, prediction latency, and accuracy for the set of granularity candidates. Since different features give different accuracy, this leverages PCA (principal component analysis) to prepare a set of feature combinations for randomly selecting the features. The selection process analysis minimizes the overhead and maintains enough variance in data for thwarting attackers of one embodiment.

The Target Detector of Evasion Attacks Changes

Figure 6:
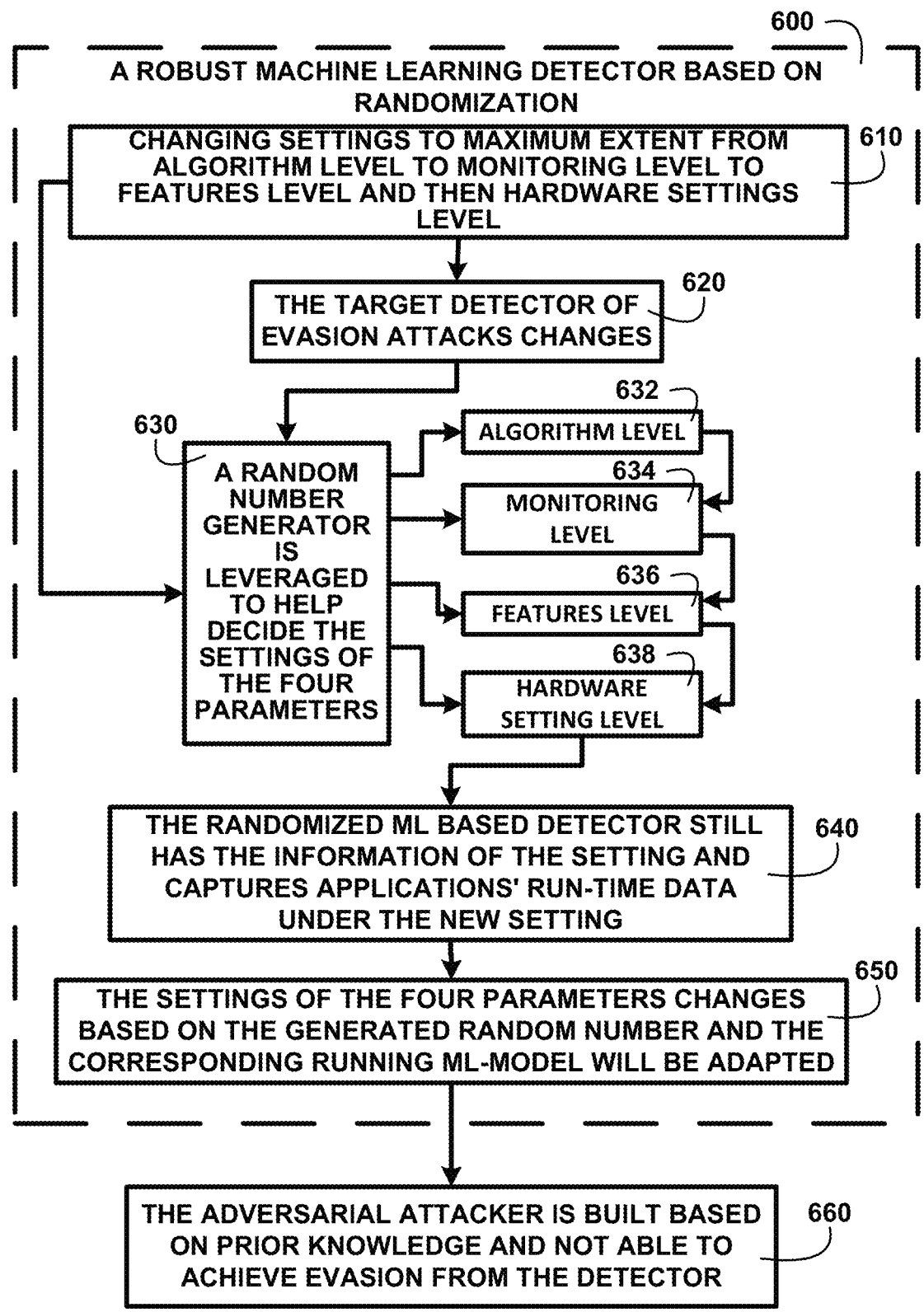
FIG. 6 shows a block diagram of an overview of the target detector of evasion attacks changes of one embodiment.

FIG. 6 shows a block diagram of an overview of the target detector of evasion attacks changes of one embodiment. FIG. 6 shows a robust ML detector based on randomization 600. The robust ML detector based on randomization 600 changing settings to a maximum extent from algorithm level to monitoring level to features level and then hardware settings level 610. The randomized changes to the settings provide the target detector of evasion attacks changes 620 to prevent the adversarial attacker from adversarial learning to attack because the target settings keep changing.

A random number generator is leveraged to help decide the settings of the four parameters 630 at the algorithm level 632, monitoring level 634, features level 636, and hardware setting level 638. The randomized ML-based detector still has the information of the setting and captures applications' run-time data under the new setting 640 to prevent any damage to the user data, software, apps, and operating systems. The settings of the four parameters change based on the generated random number and the corresponding running ML-model will be adapted 650. The adversarial attacker is built based on prior knowledge and is not able to achieve evasion from the detector 660 of one embodiment.

Providing randomized machine learning-based malware detectors to prevent malware adversarial attacks. Providing a random generator coupled to the randomized machine learning-based malware detector for determining changes of settings and selections of parameters. Selecting candidate classifiers initiated by a random number to avoid transferable learning. Determining a trade-off among monitoring granularity, prediction latency, and accuracy for prepare a set of feature combinations for random feature selection. Providing a random number for identifying a set of feature combinations that can minimize the overhead and maintain enough variance in data for preventing the malware adversarial attacks of one embodiment.

A Randomized ML-Based Malware Detector

Figure 7:
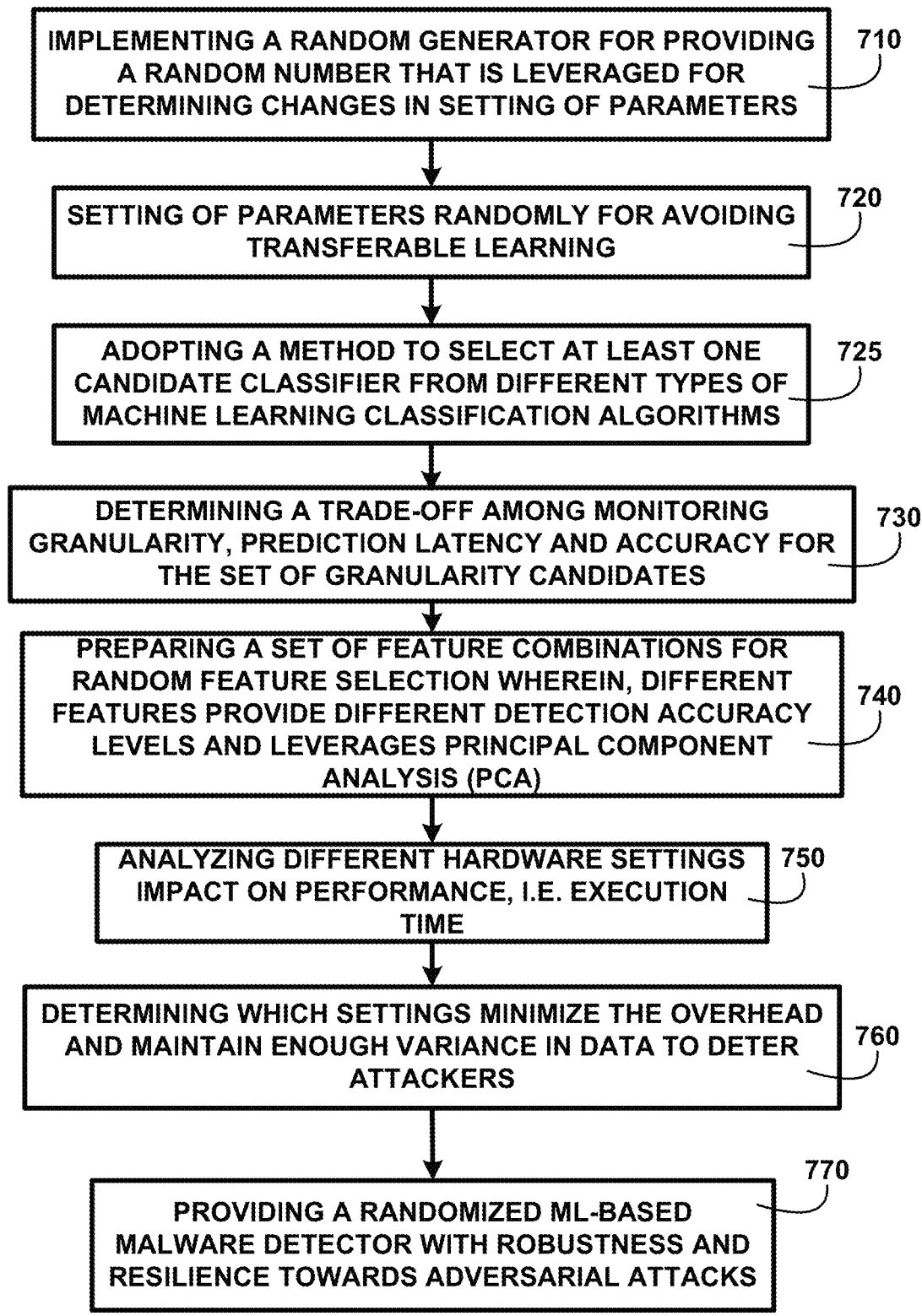
FIG. 7 shows a block diagram of an overview flow chart of a randomized ML-based malware detector of one embodiment.

FIG. 7 shows a block diagram of an overview flow chart of a randomized ML-based malware detector of one embodiment. FIG. 7 shows implementing a random number generator for providing a random number that is leveraged for determining changes in the setting of parameters 710. The parameter settings determinations are made at the algorithm level 632 of FIG. 6, monitoring level 634 of FIG. 6, features level 636 of FIG. 6, and hardware setting level 638 of FIG. 6. Determining parameter setting changes is for the setting of parameters randomly for avoiding transferable learning 720. The randomized ML-based malware detector utilizes a method to select at least one candidate classifier from different types of machine learning classification algorithms 725. In making the determinations of the parameter settings changes a process algorithm is used for determining a trade-off among monitoring granularity, prediction latency, and accuracy for the set of granularity candidates 730.

The method includes preparing a set of feature combinations for random feature selection wherein, different features provide different detection accuracy levels and leverages principal component analysis (PCA) 740. The determinations include analyzing different hardware settings' impact on performance, i.e. execution time 750. Additional analysis is made for determining which settings minimize the overhead and maintain enough variance in data to deter attackers 760. The random number generator number that determines the set of parameters is providing a randomized ML-based malware detector with robustness and resilience towards adversarial attacks 770.

Monitoring App Updates

Figure 8:
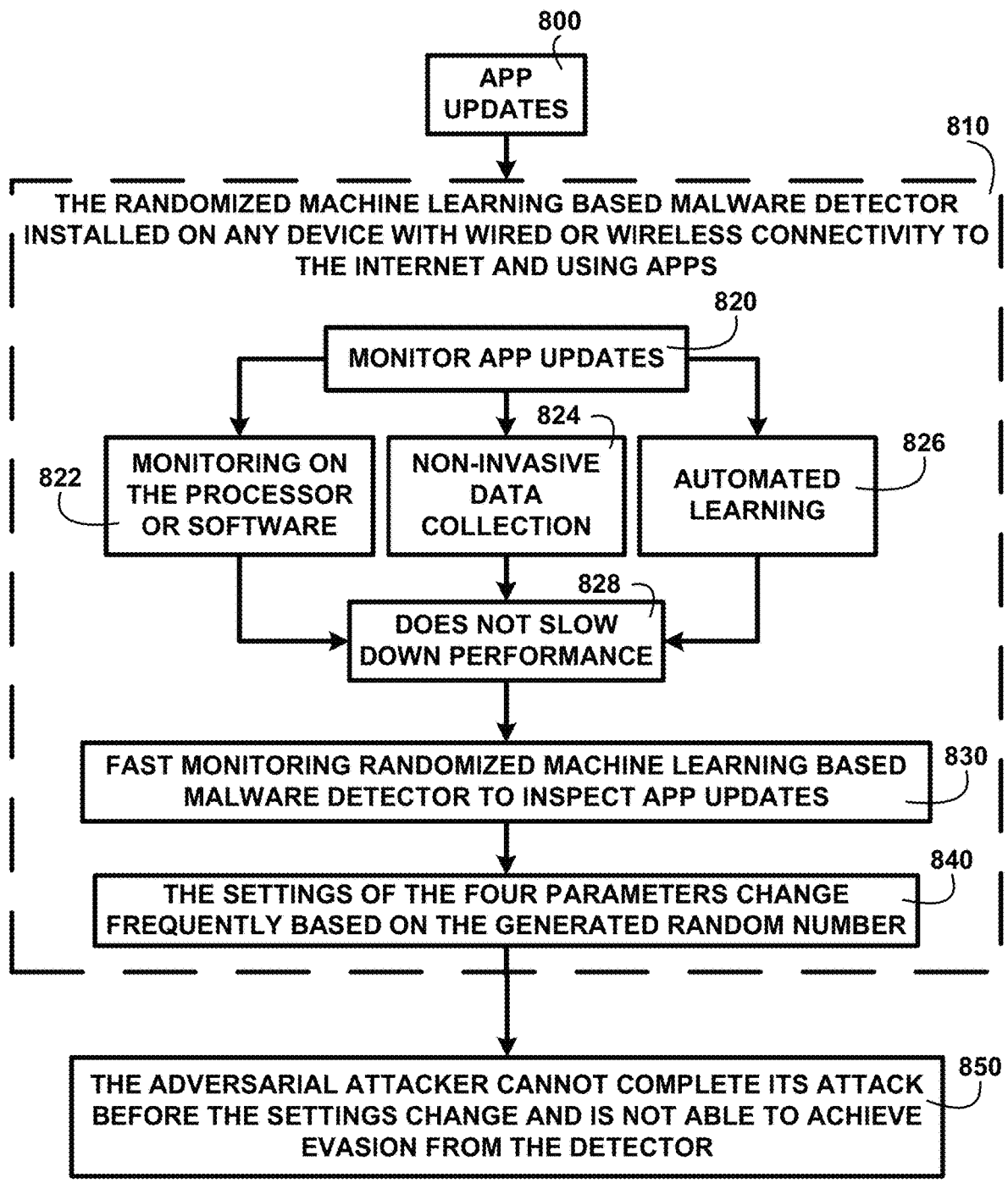
FIG. 8 shows a block diagram of an overview of monitoring app updates of one embodiment.

FIG. 8 shows a block diagram of an overview of monitoring app updates of one embodiment. FIG. 8 shows app updates 800 being imported into any device with wired or wireless connectivity to the internet and using apps. Installing the randomized machine learning-based malware detector installed on any device with wired or wireless connectivity to the internet and using apps 810 will prevent attacks from updates of apps on the device. Any device with wired or wireless connectivity to the internet and using apps includes but is not limited to any type of digital phone, computer, game consoles, smart appliances, TVs, car's infotainment systems, smartwatches, tablets, and other digital devices that use and update apps. The entry into the computer through emails, app updates, and data downloads further complicate the malware threat. Many computer users opt for automatic updates of apps. The automatic app updates are generally performed in the background in many cases with the user unaware that they are taking place. App downloads and updates also can include malware embedded into the app at the legitimate source without the source being aware of its presence. When a user downloads the app or an app update is executed the embedded malware is downloaded into the user's computer without any idea that the app is infected with the malware. Outlets for apps are generally an app store or an app developer website. These are additional targets for malware attackers. If the attacker is successful in planting the malware into an app the distribution of the malware can be accomplished by the unsuspecting legitimate source.

According to the 2020 McAfee threats report, 375 threats per minute were recorded in the first quarter of 2020. Additionally, new mobile malware has been significantly increased by 71% during the first quarter of 2020 and increase by 12% compared to the previous four quarters. Furthermore, 58% of new Internet of Things (IoT) malware was discovered during the first quarter of 2020. On the other hand, the recent proliferation of computing devices in mobile and IoT domains further exacerbates the malware attacks and calls for effective malware detection techniques. Thus, there is an increasing demand in addressing this emerging challenge of detecting and mitigating threats involving resource-constrained IoT and mobile devices.

Any device with wired or wireless connectivity to the internet and using apps for example a cell phone, smartphone, computer, game consoles, smart appliances, TVs, car infotainment systems, smartwatches, tablets, and other devices with apps. Other devices with apps include for example Computerized Numerical Control (CNC) industrial machines; aircraft equipped with the weather, navigation radar systems, control tower communications devices; financial institutions intra- and inter-banking transaction systems including wiring transactions; businesses and government confidential and top-secret data transmission systems; consumer debit and credit card transactions with vendors and ATMs; and companies involved in inter-data transfers from app creation to distribution from for example app stores to name a few with the randomized machine learning-based malware detector installed on such a device is provided the detection and protection against malware attacks.

The randomized machine learning-based malware detector 100 of FIG. 1 will monitor app updates 820 being received on any device with apps. The randomized machine learning-based malware detector 100 of FIG. 1 initiates monitoring on the processor or software 822 using non-invasive data collection 824 and automated learning 826.

Non-invasive data collection is used for monitoring on a processor or software and collect data without disrupting activities that could alter the data being collected. Non-invasive data collection does not slow down performance.

Automated learning is the process of automating the tasks of applying machine learning. Automating the process of applying machine learning is used to compare the relative importance of each factor in a prediction model. The randomized machine learning-based malware detector 100 of FIG. 1 includes a machine learning device 106 of FIG. 1 and a random number generator 101 of FIG. 1 to initiate a different setting of the internet-connected device programming and hardware. These machine learning (ML) based detectors are trained to predict whether a running program contains malicious activities or not. Automated learning is applied to interval randomized ML-based detector changed settings 350 of FIG. 3, long short-term memory (LSTM) 520 of FIG. 5, granularity 530 of FIG. 5, and program and app classifiers. Automated learning offers the advantages of producing simpler solutions, faster creation of those solutions, and randomized ML-based malware detection models. The randomized machine learning-based malware detector 100 of FIG. 1 app update monitoring does not slow down performance 828 of the device and operates in the background. Monitoring the processor or software and collecting data in a non-invasive manner and does not slow down performance. The operations provide fast monitoring randomized machine learning-based malware detector to inspect app updates 830 wherein the settings of the four parameters change frequently based on the generated random number 840. The adversarial attacker cannot complete its attack before the settings change and are not able to achieve evasion from the detector 850 of one embodiment.

A Random Number Generator

Figure 9:
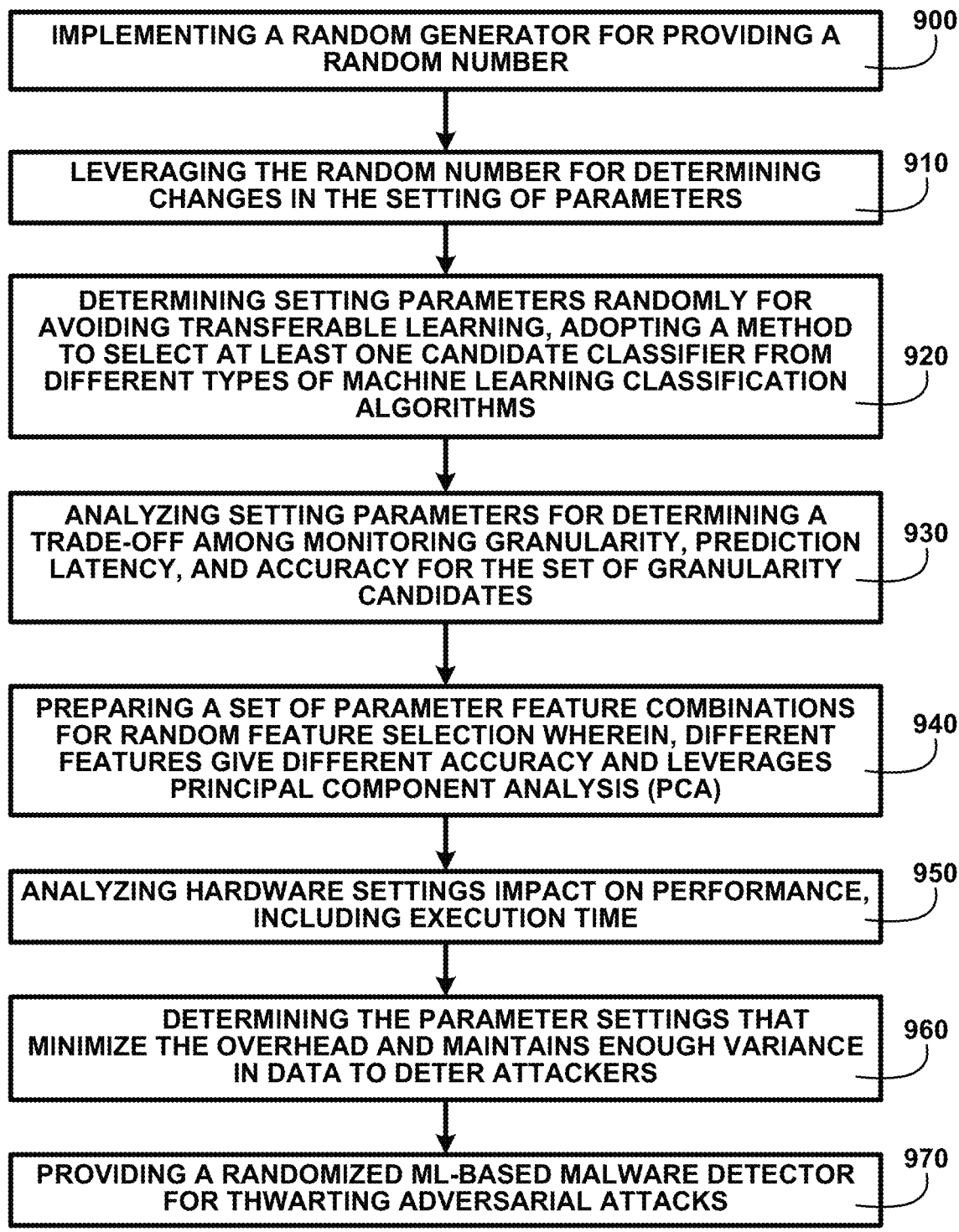
FIG. 9 shows a block diagram of an overview flow chart of a random number generator of one embodiment.

FIG. 9 shows a block diagram of an overview flow chart of a random number generator of one embodiment. FIG. 9 shows implementing a random number generator for providing a random number 900. Leveraging the random number for determining changes in the setting of parameters 910. The parameters are the particular operations of the various components of a computer.

Computer components include but are not limited to a motherboard, central processing unit (CPU), random access memory (RAM), a graphics card, sound card, hard drive, solid state drive (SSD), flash memory, machine learning classifiers (ML classifiers), monitor, keyboard wired or wireless, mouse wired or wireless, communication components for data transfers internal to the computer and for data transfers external to the computer for example the internet, headphones, external drives, and common external peripherals including but not limited to a printer, scanner and computer speakers. The components are coupled through a buss through which data transfer are transmitted both internally and externally. Each component interacts with other components with complementary features and functions.

Another component to which those above are all directly coupled is a power supply unit (PSU) from which each component receives the electrical power to operate. A computer power supply supplies at least for example the following voltages: +3.3 v: This voltage is supplied to the motherboard, +5V: This voltage is supplied to the motherboard and other internal components, +12V: This voltage is supplied to the motherboard and other internal components, and −12V: This voltage is supplied to the motherboard.

The voltages are one aspect of the power usage and another is the wattage. The higher the wattage, the higher the electrical current that can be made available to components during operation cycles require varying electrical current levels. The PSU also includes at least one cooling fan that cools all the internal components to stay cool when the power supply is subjected to bigger loads. Bigger loads occur for example when a component is being used versus when the component is not being used. These fluctuations uncontrolled are one of the vulnerabilities that make adversarial attacks possible. The components of computer models are well known including their characteristics of power consumption when being used or not being in use.

Other sets of characteristics well known are for example clock speed and frequency. A CPU processes many instructions (low-level calculations like arithmetic) from different programs every second. The clock speed measures the number of cycles the CPU executes per second, measured in gigahertz (GHz). A "cycle" is technically a pulse synchronized by an internal oscillator or simplified a cycle is a basic unit that helps understand a CPU's speed. During each cycle, billions of transistors within the processor open and close. Frequency is more operations within a given amount of time. For example a CPU with a clock speed of 3.2 (GHz) executes 3.2 billion cycles per second. For example multiple instructions are completed in a single clock cycle; in other cases, one instruction might be handled over multiple clock cycles.

The performance settings for similar components differ from one to another model and design. The differences allow selecting different component models to change settings in a first machine-learning process. In other cases a component has adjustable performance settings which can be manipulated to change performance settings in a first machine-learning process. The performance settings may include power consumption in different states, frequency of calculations, heat dissipation and other characteristics which herein are referred to as parameter settings. As described above resetting parameters involves selecting different components models and making adjustments to component performance settings. Resetting one or more parameters of a first machine-learning process, with a frequency of resetting the one or more parameters of the first machine-learning process is faster than a shortest time period that a second machine-learning process is capable of determining two or more parameters of the first machine-learning process. A second machine-learning process includes malware.

Determining setting parameters randomly for avoiding transferable learning, adopting a method to select at least one candidate classifier from different types of machine learning classification algorithms 920. Analyzing setting parameters for determining a trade-off among monitoring granularity, prediction latency, and accuracy for the set of granularity candidates 930.

Preparing a set of parameter feature combinations for random feature selection wherein, different features give different accuracy and leverage principal component analysis (PCA) 940. Analyzing hardware settings impact on performance, including execution time 950. Determining the parameter settings that minimize the overhead and maintains enough variance in data to deter attackers 960. Providing a randomized ML-based malware detector for thwarting adversarial attacks 970 of one embodiment.

Figure 11:
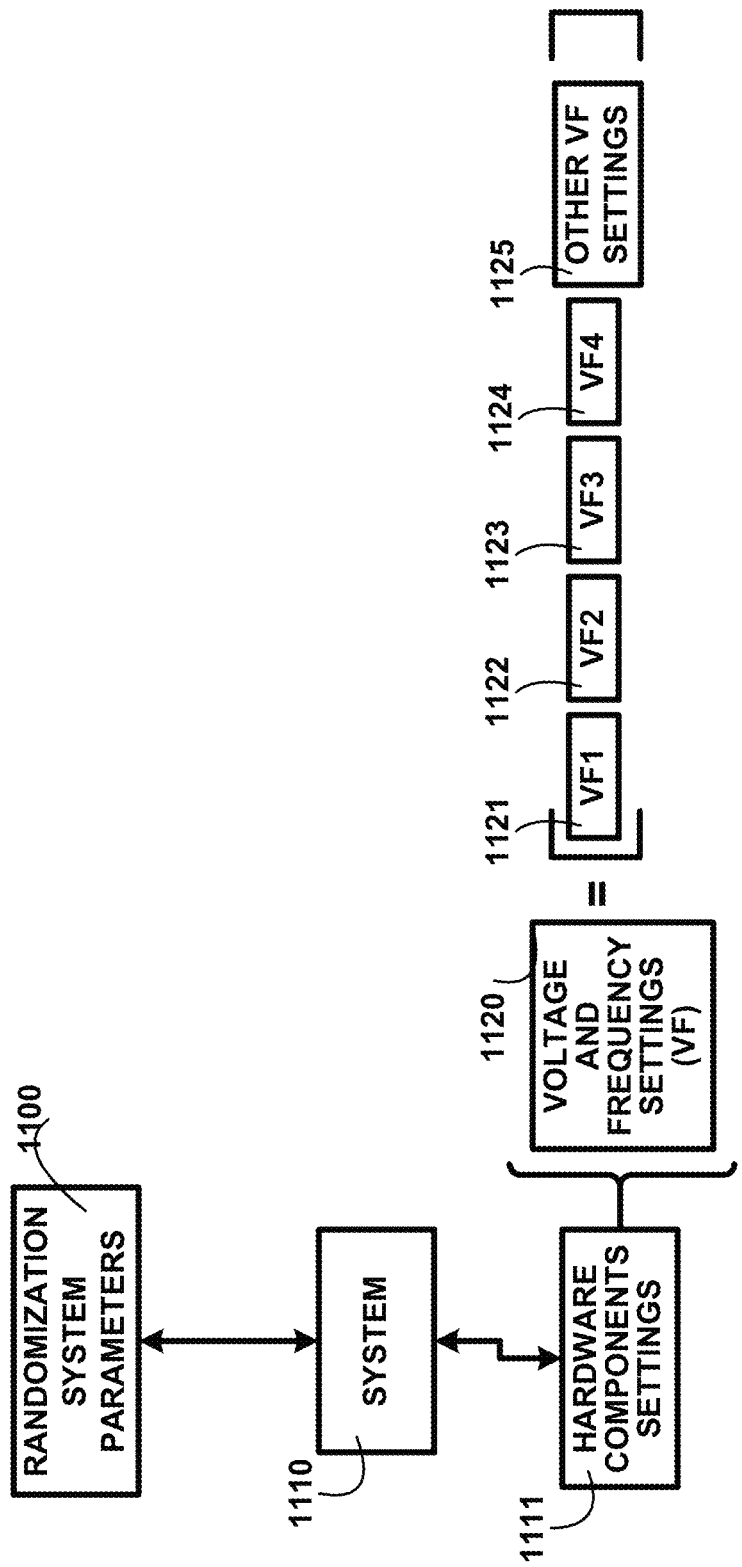
FIG. 11 shows for illustrative purposes only an example of randomization system parameters of one embodiment.

Determining setting parameters randomly for avoiding transferable learning includes adopting a method to select at least one candidate classifier from different types of machine learning classification algorithms 920. This is accomplished with msec randomized classifier selections 102 of FIG. 1 and msec randomized hardware settings 104 of FIG. 1. Once the classifiers are trained, a set of predictive models are available to be selected according to the value of the random number generated. Processing randomization system parameters 1100 of FIG. 11 where system 1110 of FIG. 11 includes hardware components settings 1111 of FIG. 11 including voltage and frequency settings (VF) 1120 of FIG. 11. Digital circuits run on voltages ranging from 3.3 to 5-volts. Frequency setting for digital data transmissions range between 2.4 gigahertz to 5 gigahertz. For example, the randomization system parameters 1100 of FIG. 11 are initiated by the random number generator.

Periodic randomization of determining changes in the parameters and settings changes the target being attacked preventing the malware from using adversarial learning to breach the security of one embodiment.

Randomization Machine Learning Parameters

Figure 10:
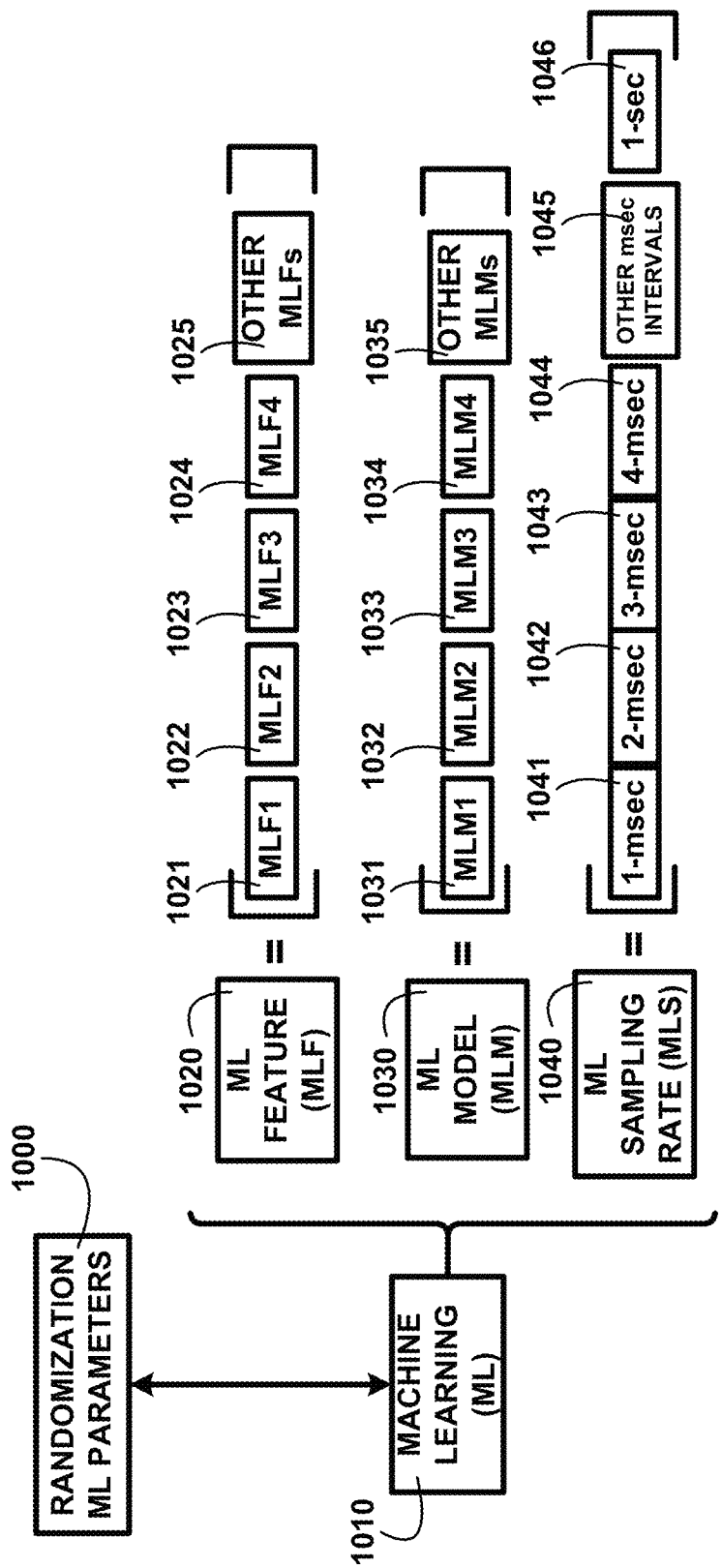
FIG. 10 shows for illustrative purposes only an example of randomization machine learning parameters of one embodiment.

FIG. 10 shows for illustrative purposes only an example of randomization machine learning parameters of one embodiment. FIG. 10 shows a process of randomization ML parameters 1000 where machine learning (ML) 1010 includes parameters. ML parameters include ML feature (MLF) 1020, ML model (MLM) 1030 and ML sampling rate (MLS) 1040. The randomization process changes the ML parameters at randomized intervals initiated by the random number generator for example MLF1 1021, MLF2 1022, MLF3 1023, MLF4 1024, and other MLFs 1025.

Also ML model (MLM) 1030 parameters are changed at intervals for example MLM1 1031, MLM2 1032, MLM3 1033, MLM4 1034 and other MLMs 1035. Additionally the ML sampling rate (MLS) 1040 parameters are changed in a range for example 1-msec 1041, 2-msec 1042, 3-msec 1043, 4-msec 1044 and other msec intervals 1045 up to 1-sec 1046.

Randomizing the changes in device operating features at msec intervals prevents the adversarial attackers from machine learning features being utilized and presents vulnerability rapidly enough to plant a virus or access user data. The max randomization 210 of FIG. 2 process changes the ML parameters at randomized intervals initiated by the random number generator. The random number generator 101 of FIG. 1 resets parameters at intervals ranging from 1.1 milliseconds to 1.0 second.

Randomization System Parameters

FIG. 11 shows for illustrative purposes only an example of randomization system parameters of one embodiment. FIG. 11 shows processing randomization system parameters 1100 where system 1110 includes hardware components settings 1111 including voltage and frequency settings (VF) 1120. For example, the randomization system parameters 1100 is initiated by the random number generator and produces the system parameter changes VF1 1121, VF2 1122, VF3 1123, VF4 1124, and other VF settings 1125 at frequent intervals.

The randomized machine learning-based malware detector 100 of FIG. 1 builds adversarial resilient detectors by changing settings across the architecture level and system level. Frequent interval randomized changes in parameter settings 354 prevent malware attacks because the adversarial attacker cannot determine interval randomized ML-based detector changed settings 350 to access the device system. The number of adversarial attackers and the number of simultaneous malware attacks do not affect the stonewalling effect of the randomized device feature changing every msec of one embodiment.

Randomization Intervals

Figure 12:
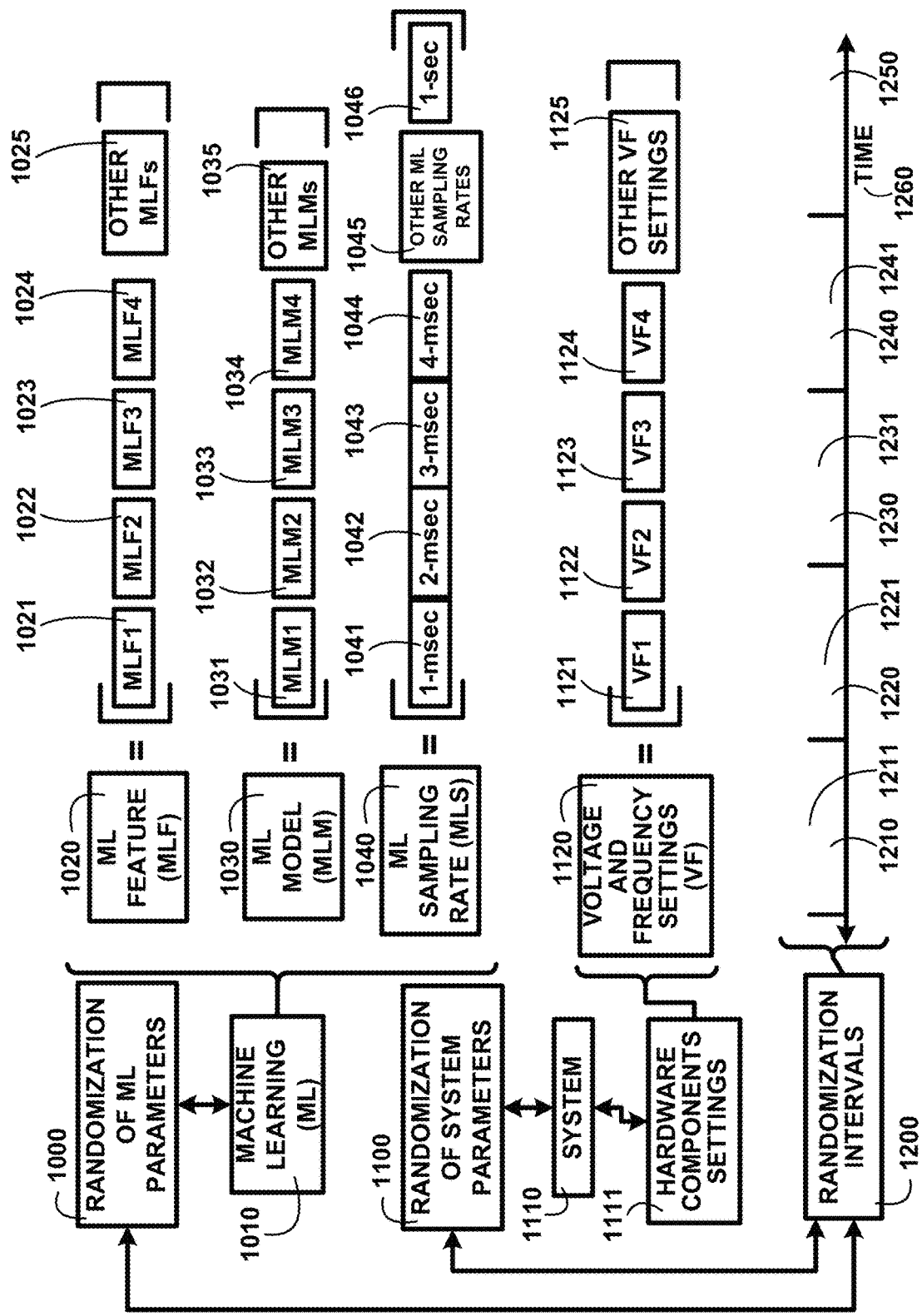
FIG. 12 shows for illustrative purposes only an example of randomization intervals of one embodiment.

FIG. 12 shows for illustrative purposes only an example of randomization intervals of one embodiment. FIG. 12 shows randomization intervals initiated by the random number generator. Each randomization interval is shown in a different grouping of ML parameters settings and system parameters settings. FIG. 12 shows randomization ML parameters 1000 including machine learning (ML) 1010, ML feature (MLF) 1020, MLF1 1021, MLF2 1022, MLF3 1023, MLF4 1024, and other MLFs 1025.

Also shown is the ML model (MLM) 1030, MLM1 1031, MLM2 1032, MLM3 1033, MLM4 1034, and other MLMs 1035. Additionally showing are the ML sampling rate (MLs) 1040, 1-msec 1041, 2-msec 1042, 3-msec 1043, 4-msec 1044, other msec intervals 1045 up to 1-sec 1046. Randomization system parameters 1100 shows system 1110 setting changes hardware components settings 1111 including voltage and frequency settings (VF) 1120, VF1 1121, VF2 1122, VF3 1123, VF4 1124, and other VF settings 1125.

Randomization intervals 1200 are shown with an example of different parameters selected randomly per interval including interval 1 grouping 1211 includes MLF1 1021, MLF2 1022, MLM1, 1-msec 1041, and VF1 1121. Interval 2 grouping 1221 includes MLF3 1023, MLM2 1032, 2-msec 1042, and VF2. Interval 3 grouping 1231 includes MLF1 1021, MLF2 1022, MLF3 1023, MLF4 1024, MLM1 1031, 1-msec 1041, and VF1 1121. Interval 4 grouping 1241 includes MLF3 1023, MLF4 1024, MLM3 1033, 3-msec 1043, and VF4 1124. Continuing intervals 1250 groupings include other MLFs 1025, other MLMs 1035, other ml sampling rates 1045, and other VF settings 1125 over time 1260.

The malware attack takes time to identify and learn for example which classifier is operating in order to breach the operations and access user data or place a ransomware virus. The randomized machine learning-based malware detector 100 of FIG. 1 changes the attacker's target with a frequency that does not allow the time the malware attack needs to learn the target and breach the security of one embodiment.

The foregoing has described the principles, embodiments, and modes of operation of the present invention. However, the invention should not be construed as being limited to the particular embodiments discussed. The above-described embodiments should be regarded as illustrative rather than restrictive, and it should be appreciated that variations may be made in those embodiments by workers skilled in the art without departing from the scope of the present invention as defined by the following claims.

What is claimed is:

1. A method, comprising:
   changing settings including voltage and frequency and selections including machine learning classifiers of parameters based on a random generator coupled to a randomized machine learning (ML)-based malware detector;
   selecting candidate machine learning classifiers coupled to the randomized machine learning-based malware detector initiated by a random number to avoid transferable learning;
   determining a set of feature combinations for random feature selection including monitoring granularity and prediction latency;
   resetting one or more parameters of a first machine-learning process, wherein a frequency of resetting the one or more parameters of the first machine-learning process is faster than a shortest time period that a second machine-learning process is capable of determining two or more parameters of the first machine-learning process; and
   identifying a set of feature combinations that minimize overhead and maintain enough variance in data based on a random number for baffling the malware adversarial attacks.

2. The method of claim 1, further comprising baffling second machine-learning process malware.

3. The method of claim 1, further comprising resetting first machine-learning process parameters includes voltages ranging from −12 volts to +12 volts.

4. The method of claim 1, further comprising changing at least one device system settings frequently including frequency settings, wherein digital circuits run on frequency settings for digital data transmissions range from 2.4 gigahertz to 5 gigahertz.

5. The method of claim 1, further comprising collecting data in a non-invasive process that does not slow down performance.

6. The method of claim 1, further comprising monitoring with the randomized machine learning-based malware detector a computer system operation to inspect app updates wherein the settings of four parameters are changed frequently based on the generated random number.

7. The method of claim 1, further comprising operating the randomized ML-based malware detector system on any device with apps including a cell phone, smartphone, computer, game consoles, smart appliances, TVs, car infotainment systems, smartwatches, tablets, and other devices with apps.

8. The method of claim 1, further comprising operating the randomized ML-based malware detector system on devices with apps including Computerized Numerical Control (CNC) industrial machines; aircraft equipped with the weather, navigation radar systems, control tower communications devices; financial institutions intra- and inter-banking transaction systems including wiring transactions; businesses and government confidential and top-secret data transmission systems; consumer debit and credit card transactions with vendors and ATMs; and companies involved in inter-data transfers from app creation to distribution, and app stores.

9. The method of claim 1, further comprising monitoring app updates being received on any device with apps with the randomized machine learning-based malware detector.

10. The method of claim 1, further comprising changing the device settings with the randomized machine learning-based malware detector at intervals ranging from 1.1 milliseconds to 1.0 second to prevent an adversarial attacker from completing its attack and not able to achieve evasion from the detector before the settings are changed.

11. An apparatus, comprising:
    a random number generator coupled to a randomized machine learning-based malware detector configured for determining changes of settings and selections of parameters;
    candidate classifiers integrated with the randomized machine learning-based malware detector and configured to be initiated by a random number to avoid transferable learning;
    a set of feature combinations for random feature selection including monitoring granularity and detection prediction latency; and
    a random number for identifying a set of feature combinations that minimize the overhead and maintain enough variance in data for baffling the malware adversarial attacks.

12. The apparatus of claim 11, further comprising at least one device for changing parameters settings of at least a motherboard, central processing unit (CPU), random access memory (RAM), a graphics card, sound card, hard drive, solid state drive (SSD), flash memory, machine learning classifiers (ML classifiers), monitor, keyboard wired or wireless, mouse wired or wireless, communication components for data transfers internal to the computer and for data transfers external to the computer for example the internet, headphones, external drives, and common external peripherals including but not limited to a printer, scanner, computer speakers and a power supply unit (PSU).

13. The apparatus of claim 11, further comprising a random number generator for resetting parameters at randomization frequency intervals in milliseconds.

14. The apparatus of claim 11, further comprising a classifier selection device to select at least one candidate classifier from different types of machine learning classification algorithms.

15. The apparatus of claim 11, further comprising a randomized machine learning-based malware detector for app updates wherein settings of four operating parameters are changed frequently based on the generated random number to prevent malware attacks.

16. A system, comprising:
- a random number generator coupled to a randomized machine learning-based malware detector for generating a random number in intervals measured in milliseconds;
- a plurality of sets of machine learning parameters, hardware and system settings for randomization of selection and changing machine learning parameters, hardware and system settings initiated with the random number;
- a plurality of candidate classifiers coupled to the randomized machine learning-based malware detector for randomized selection;
- a plurality of sets of parameter feature combinations coupled to the randomized machine learning-based malware detector for random feature selection to avoid transferable learning; and
- the randomized machine learning-based malware detector for thwarting adversarial attacks.

17. The system of claim 16, further comprising a machine learning device coupled to the randomized machine learning-based malware detector configured for determining parameter settings that minimize overhead and maintains enough variance in data to deter attackers.

18. The system of claim 16, further comprising a random number generator for initiating resetting parameters at intervals in milliseconds.

19. The system of claim 16, further comprising at least one device for changing system settings including voltage and frequency settings.

20. The system of claim 16, further comprising a random number generator initiating resetting parameters at intervals frequently to prevent an adversarial attacker from completing its attack before the settings are changed.

* * * * *